(12) United States Patent
McGoldrick

(10) Patent No.: US 11,574,126 B2
(45) Date of Patent: Feb. 7, 2023

(54) SYSTEM AND METHOD FOR PROCESSING NATURAL LANGUAGE STATEMENTS

(71) Applicant: ROYAL BANK OF CANADA, Montreal (CA)

(72) Inventor: Garrin McGoldrick, Toronto (CA)

(73) Assignee: ROYAL BANK OF CANADA, Montreal (CA)

(*) Notice: Subject to any disclaimer, the term of this patent is extended or adjusted under 35 U.S.C. 154(b) by 406 days.

(21) Appl. No.: 16/440,836

(22) Filed: Jun. 13, 2019

(65) Prior Publication Data

US 2019/0384814 A1 Dec. 19, 2019

Related U.S. Application Data

(60) Provisional application No. 62/684,377, filed on Jun. 13, 2018.

(51) Int. Cl.
| | |
|---|---|
| G06F 16/34 | (2019.01) |
| G06F 40/30 | (2020.01) |
| G06F 17/16 | (2006.01) |
| G06N 3/08 | (2006.01) |
| G06N 5/04 | (2006.01) |
| G06N 20/00 | (2019.01) |
| G06F 40/295 | (2020.01) |

(52) U.S. Cl.
CPC .............. *G06F 40/30* (2020.01); *G06F 17/16* (2013.01); *G06F 40/295* (2020.01); *G06N 3/08* (2013.01); *G06N 5/046* (2013.01); *G06N 20/00* (2019.01)

(58) Field of Classification Search
CPC .... G06F 17/16; G06F 40/30; G06F 16/24522; G06F 16/3347; G06F 40/216; G06N 20/00; G06N 3/08; G06N 5/046; G06N 3/0445; G06N 3/0481

See application file for complete search history.

(56) References Cited

U.S. PATENT DOCUMENTS

| | | | | |
|---|---|---|---|---|
| 2010/0262454 | A1* | 10/2010 | Sommer | G06Q 30/02 706/20 |
| 2011/0106743 | A1* | 5/2011 | Duchon | G06F 16/35 706/46 |
| 2013/0138577 | A1* | 5/2013 | Sisk | G06Q 40/04 705/36 R |
| 2013/0297590 | A1* | 11/2013 | Zukovsky | G06F 16/951 707/722 |
| 2017/0192956 | A1* | 7/2017 | Kaiser | G10L 25/30 |
| 2018/0121539 | A1* | 5/2018 | Ciulla | G06F 16/3344 |
| 2018/0150743 | A1* | 5/2018 | Ma | G06N 3/0445 |
| 2019/0236462 | A1* | 8/2019 | Davison | G06F 40/30 |

OTHER PUBLICATIONS

Merity, Stephen; Keshar, Nitish Shirish; Socher, Richard, "Regularizing and Optimizing LSTM Language Models", Salesforce Research, Palo Alto, U.S.A., Aug. 7, 2017, pp. 1 to 10, available at: https://arxiv.org/abs/1708.02182.

* cited by examiner

*Primary Examiner* — Olujimi A Adesanya
(74) *Attorney, Agent, or Firm* — Norton Rose Fulbright Canada LLP

(57) ABSTRACT

Systems and methods for processing natural language statements. Based on historical records of data associated with an entity, systems and methods provide models for inferring publication of data content associated with the particular entity. The systems and methods may compare newly observed data content to predicted content associated with an entity for evaluating novelty or impact of the newly observed data content.

20 Claims, 8 Drawing Sheets

SYSTEM AND METHOD FOR PROCESSING NATURAL LANGUAGE STATEMENTS

CROSS-REFERENCE TO RELATED APPLICATIONS

This application claims all benefit including priority to U.S. Provisional Patent Application No. 62/684,377, filed Jun. 13, 2018, and entitled: "SYSTEM AND METHOD FOR PROCESSING NATURAL LANGUAGE STATEMENTS", the entirety of which is hereby incorporated by reference.

FIELD

The present disclosure generally relates to the field of machine learning, and more specifically, to processing natural language articles and statements using machine learning.

BACKGROUND

Widespread use of computing devices and networks enables access to vast amounts of data content in the form of articles, journals, webpages, or the like. In some scenarios, several independent content sources may provide content directed to similar subject matter. Natural language processing methods and systems may be used to process data content for analysis.

SUMMARY

Embodiments disclosed herein may provide systems and methods for processing natural language articles and statements using machine learning.

In one aspect, there is provided a computer-implemented system for processing natural language statements. The system may include a processor and a memory coupled to the processor storing processor readable instructions that, when executed, may cause the processor to: receive an entity index value associated with an identified entity; generate an embedded content dimension vector based on an embedding data structure associated with statements made about the identified entity; generate a content weight vector based on the embedding data structure; receive a statement history matrix including at least one content representation vector of an associated historical statement; transform the statement history matrix with the generated content weight vector to provide a historical content dimension vector; and generate a content prediction score by generating a combination of the embedded content dimension vector and the historical content dimension vector and transforming the combination with an activation function.

In some examples, the processor readable instructions may cause the processor to: generate a predicted statement based on the content prediction score; and determine a novelty score based on an identified statement received at the system and the predicted statement.

In some examples, the processor readable instructions may cause the processor to: combine a data representation of the identified statement with a set of historic statements associated with the statement history matrix to provide an updated statement history matrix; generate an updated content prediction score and a subsequent predicted statement based on the updated statement history matrix; and determine an impact score based on the predicted statement and the subsequent predicted statement.

In some examples, the processor readable instructions may cause the processor to: generate a signal for generating a communication based on the impact score.

In some examples, the communication comprises at least one of a message highlighting the identified statement received at the system, a message excluding the identified statement received at the system, or a message associated with ranking the identified statement received at the system among a list of ranked statements.

In some examples, generating the content prediction score includes: receiving an average dimension vector associated with a global statement set; and combining the average dimension vector with the embedded content dimension vector and the historical content dimension vector.

In some examples, the at least one content representation vector is provided by at least one recurrent neural network.

In some examples, the recurrent neural network is a gated recurrent unit.

In some examples, the activation function includes a sigmoid function.

In some examples, generating the embedded content dimension vector includes: identifying a data subset of the embedding data structure associated with the entity index value to identify an entity embeddings vector; and transforming the entity embeddings vector to the embedded content dimension vector associated with a weighted representation of content values.

In some examples, generating the content weight vector based on the embedding data structure includes: identifying a data subset of the embedding data structure associated with the entity index value to identify an entity embeddings vector; and transforming the entity embeddings vector to the content weight vector to provide a condensed representation of the entity associated with the entity index value.

In another aspect, a computer implemented method for processing natural language statements is provided. The method may comprise: receiving an entity index value associated with an identified entity; generating an embedded content dimension vector based on an embedding data structure associated with statements made about the identified entity; generating a content weight vector based on the embedding data structure; receiving a statement history matrix including at least one content representation vector of an associated historical statement; transforming the statement history matrix with the generated content weight vector to provide a historical content dimension vector; and generating a content prediction score by generating a combination of the embedded content dimension vector and the historical content dimension vector and transforming the combination with an activation function.

In some examples, the method may include generating a predicted statement based on the content prediction score; and determining a novelty score based on an identified statement received at the system and the predicted statement.

In some examples, the method may include combining a data representation of the identified statement with a set of historic statements associated with the statement history matrix to provide an updated statement history matrix; generating an updated content prediction score and a subsequent predicted statement based on the updated statement history matrix; and determining an impact score based on the predicted statement and the subsequent predicted statement.

In some examples, the method may include generating a signal for generating a communication based on the impact score, wherein the communication comprises at least one of a message highlighting the identified statement received at the system, a message excluding the identified statement received at the system, or a message associated with ranking the identified statement received at the system among a list of ranked statements.

In some examples, generating the content prediction score may include receiving an average dimension vector associated with a global statement set; and combining the average dimension vector with the embedded content dimension vector and the historical content dimension vector.

In some examples, the at least one content representation vector is provided by at least one recurrent neural network.

In some examples, the recurrent neural network may be a gated recurrent network.

In some examples, the activation function includes a sigmoid function.

In another aspect, a non-transitory computer-readable medium or media having stored thereon machine interpretable instructions which, when executed by a processor may cause the processor to perform a computer implemented method for processing natural language statements. The method may comprise: receiving an entity index value associated with an identified entity; generating an embedded content dimension vector based on an embedding data structure associated with statements made about the identified entity; generating a content weight vector based on the embedding data structure; receiving a statement history matrix including at least one content representation vector of an associated historical statement; transforming the statement history matrix with the generated content weight vector to provide a historical content dimension vector; and generating a content prediction score by generating a combination of the embedded content dimension vector and the historical content dimension vector and transforming the combination with an activation function.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Widespread use of computing devices and networks enable access to vast amounts of data content. Data content may be provided in formats such as Internet webpages, journals, articles, forums, or the like. The data content may be directed to various content categories, such as topics, and may originate from numerous discrete content publishers. For example, content categories may include current events, science and technology, business, politics, local news, arts and culture, sports, or the like. Content categories may be identified more generally or with more specificity. In some examples, data content may be published using natural language. That is, the data content may not be provided using any particular form or data structure.

Using computing devices, a content consumer may access a vast amount of data content and may conduct an action or make a decision based on such data content. Assessing vast amounts of data content accessible via computing networks for uniqueness or impact may require substantial resources. Depending on the size or complexity of data content, identifying content categories or assessing data content for uniqueness or impact may incur substantial content consumer resources.

Based on historical records of data associated with an entity, systems and methods are described to provide models for inferring publication of data content associated with the particular entity. The systems and methods described herein may compare newly observed data content to predicted content associated with an entity for evaluating novelty or impact of the newly observed data content.

It may be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

Examples of methods, systems, and apparatus herein are described through reference to the drawings.

Figure 1:
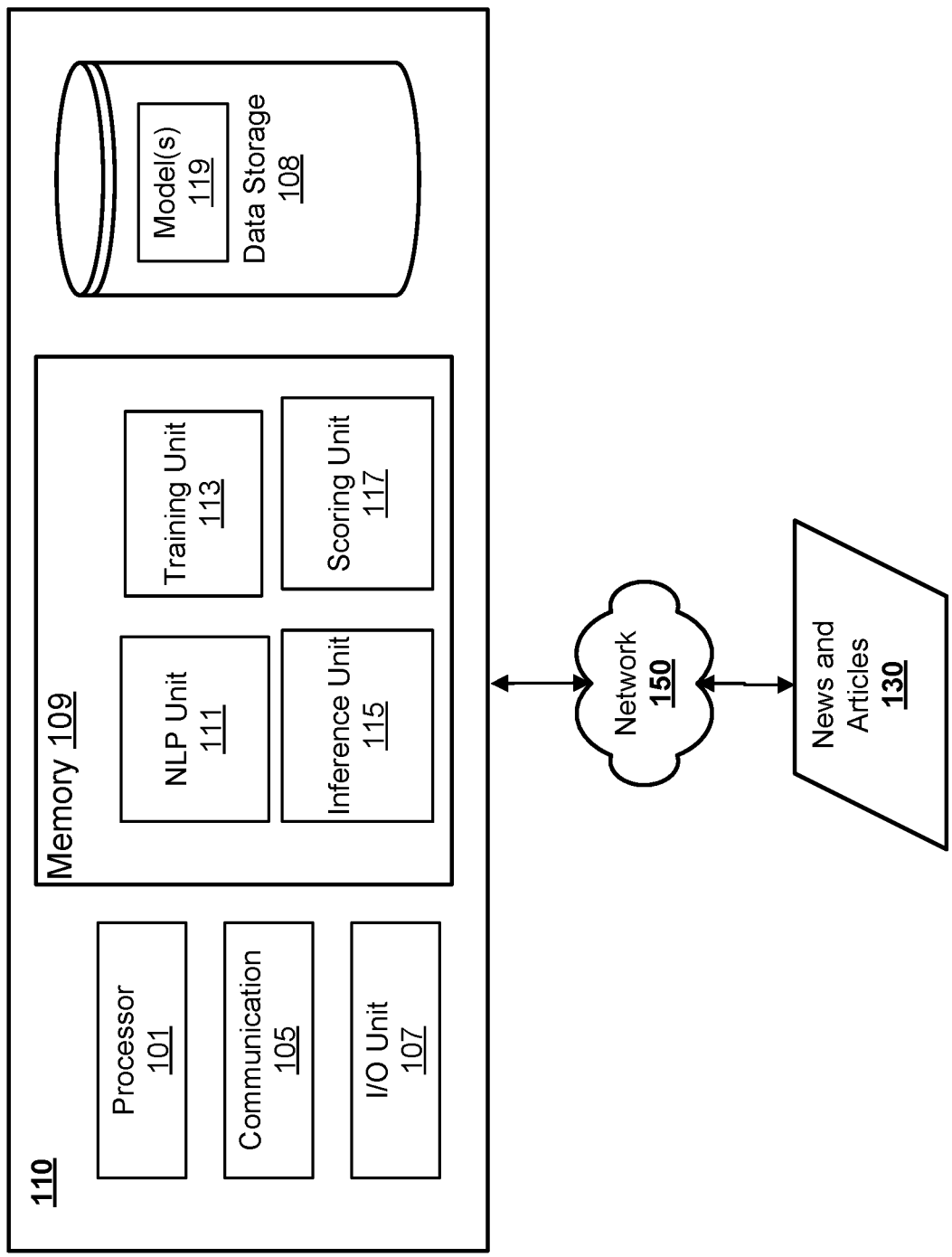
FIG. 1 is a simplified block diagram of devices for processing natural language statements, in accordance with an example of the present application.

Reference is made to FIG. 1, which illustrates a simplified block diagram of devices for processing natural language statements, in accordance with an example of the present application. FIG. 1 includes a system 110 for processing statements in natural language, for training one or more machine learning models 119 (e.g., stored in the form of one or more data sets), or for generating content prediction scores, novelty scores, or impact scores associated with data content.

In FIG. 1, the system 110 may be configured to receive data content, such as news or articles 130 via a network 150. The network may include a wired or wireless wide area network (WAN), local area network (LAN), or the like, or any combination thereof. As will be described herein, the system 110 may be configured to implement processor readable instructions that, when executed, configure a processor 101 to conduct operations described herein. For example, the system 110 may be configured to conduct operations for training machine learning models 119 over time.

A processor or processing device 101 may execute processor readable instructions stored in memory 109. The processor readable instructions may include instructions of a natural language processing (NLP) unit 111, a training unit 113, an inference unit 115, or a scoring unit 117. Processor readable instructions for conducting other operations are contemplated.

The processor or processing device 101 may be any type of general-purpose micro-processor or microcontroller, a digital signal processing (DSP) processor, an integrated circuit, a field programmable gate array (FPGA), a reconfigurable processor, or any combination thereof.

A communication interface 105 may configure the system 110 to communicate with other components or computing devices to exchange data with other components, to access and connect to network resources, to serve applications, or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. In some examples, the communication interface 105 may include one or more busses, interconnects, wires, circuits, and/or any other connection and/or control circuit, or combination thereof. The communication interface 105 may provide an interface for communicating data between components of a single device or circuit.

An I/O unit 107 may configure the system 110 to interconnect or communicate with one or more input devices, such as a keyboard, mouse, camera, touch screen and a microphone, or with one or more output devices such as a display screen and a speaker.

A data storage 108 may include one or more NAND flash memory modules of suitable capacity, or may be one or more persistent computer storage devices, such as a hard disk drive, a solid state drive, and the like. In some embodiments, data storage 108 comprises a secure data warehouse configured to host encrypted data.

Memory 109 may include a combination of computer memory such as, for example, static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

The (NLP) unit 111 may be configured to process news, articles, and statements in a natural language (e.g. English). The processing may not be restricted to one particular natural language, even though a machine learning model 119 may be trained for only one language. The NLP unit 111 may process news, articles and other form of text provided in natural language into data structure or statements for further processing by system 110.

The machine learning model 119, rankings of filters and weights, and associated rules, may be stored in data storage 108, which is configured to maintain one or more data sets, including data structures storing linkages. In some examples, the data storage 108 may be a relational database, a flat data storage, a non-relational database, or the like. In some examples, databases external to the system 110 may provide additional data sets for training or refining the model 119 of the system 110.

As will be described herein, the training unit 113 may include processor readable instructions for processing one or more data sets representative of natural language statements for training one or more models 119 to generate predictions regarding future statement(s) regarding an entity. In some embodiments, the training may be unsupervised.

As will be described herein, the inference unit 115 may include processor readable instructions for generating the predictions of data content associated with a particular entity. The scoring unit 117 include processor readable instructions for generating content prediction scores, novelty scores, impact scores, or the like, regarding data content.

In some examples, system 110 may include an API unit (not illustrated in FIG. 1) configured for providing or facilitating an interface, such as a user interface, to communicate with and exchange data with external databases or computing systems. The API unit may provide a user interface allowing administrators or users to configure the settings of the system 110. In some examples, the API unit may provide a user interface allowing a user to select a desired natural language (e.g., English, French, Spanish, etc.), data content type (e.g., news, articles, forums, etc.), publisher source (e.g., news broadcasters, sports broadcasters, academic publication sources, etc.), or the like.

Figure 2:
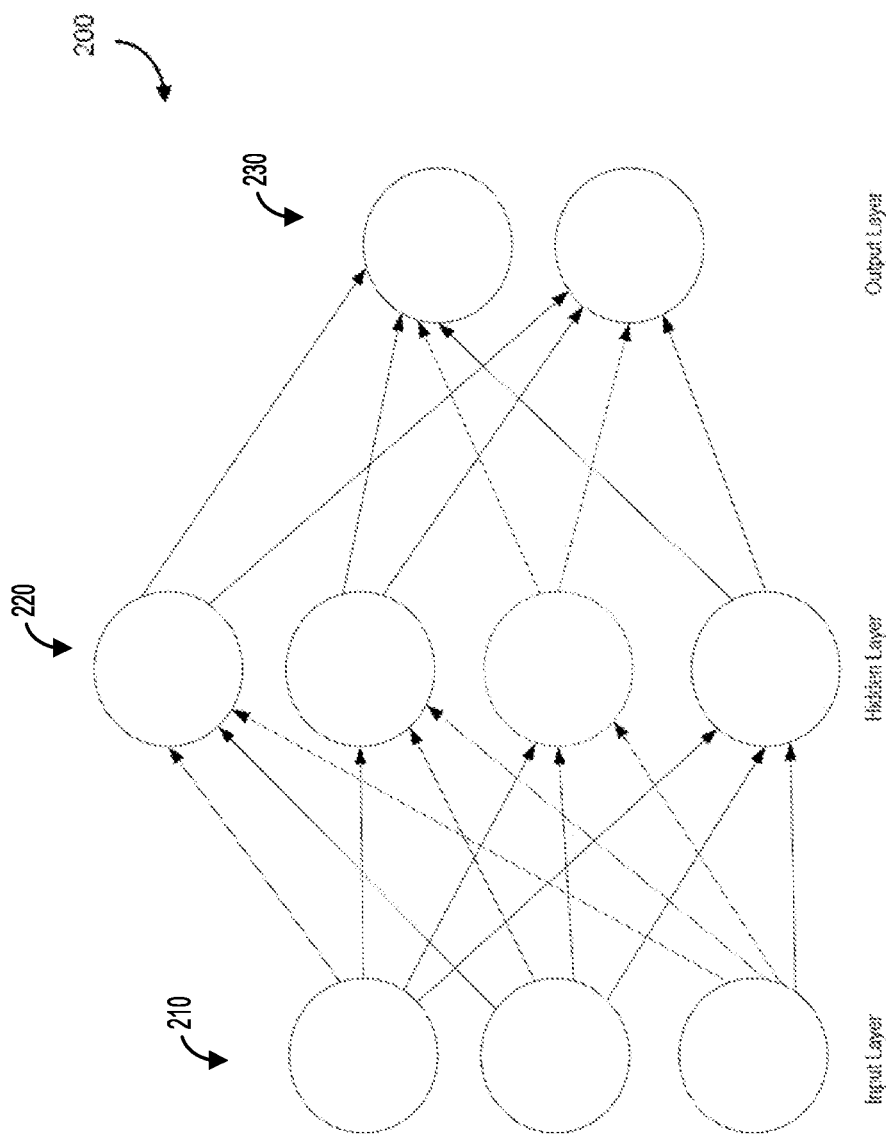
FIG. 2 illustrates a schematic diagram of a machine learning model, in accordance with an example of the present application.

Reference is made to FIG. 2, which illustrates a schematic diagram of an machine learning model 200, in accordance with an example of the present application. The machine learning model 200 may be a neural network including an input layer 210, a hidden layer 220, and an output layer 230.

In some examples, the machine learning model 200 may be any other type of learning model, such as a recurrent neural network (RNN). For instance, a RNN may be a type of neural network used for speech recognition or natural language processing (NLP) applications. An RNN may be configured to recognize sequential characteristics of data and may utilize patterns to predict a next likely output or scenario. In some examples, an RNN may include layers of network nodes for processing input and forwarding output to other nodes in the network. The network nodes may be associated with weights that may associate relative weighting of forwarded output at a subsequent node or layer in the network. Other types of machine learning models 200 may be contemplated.

Figure 3:
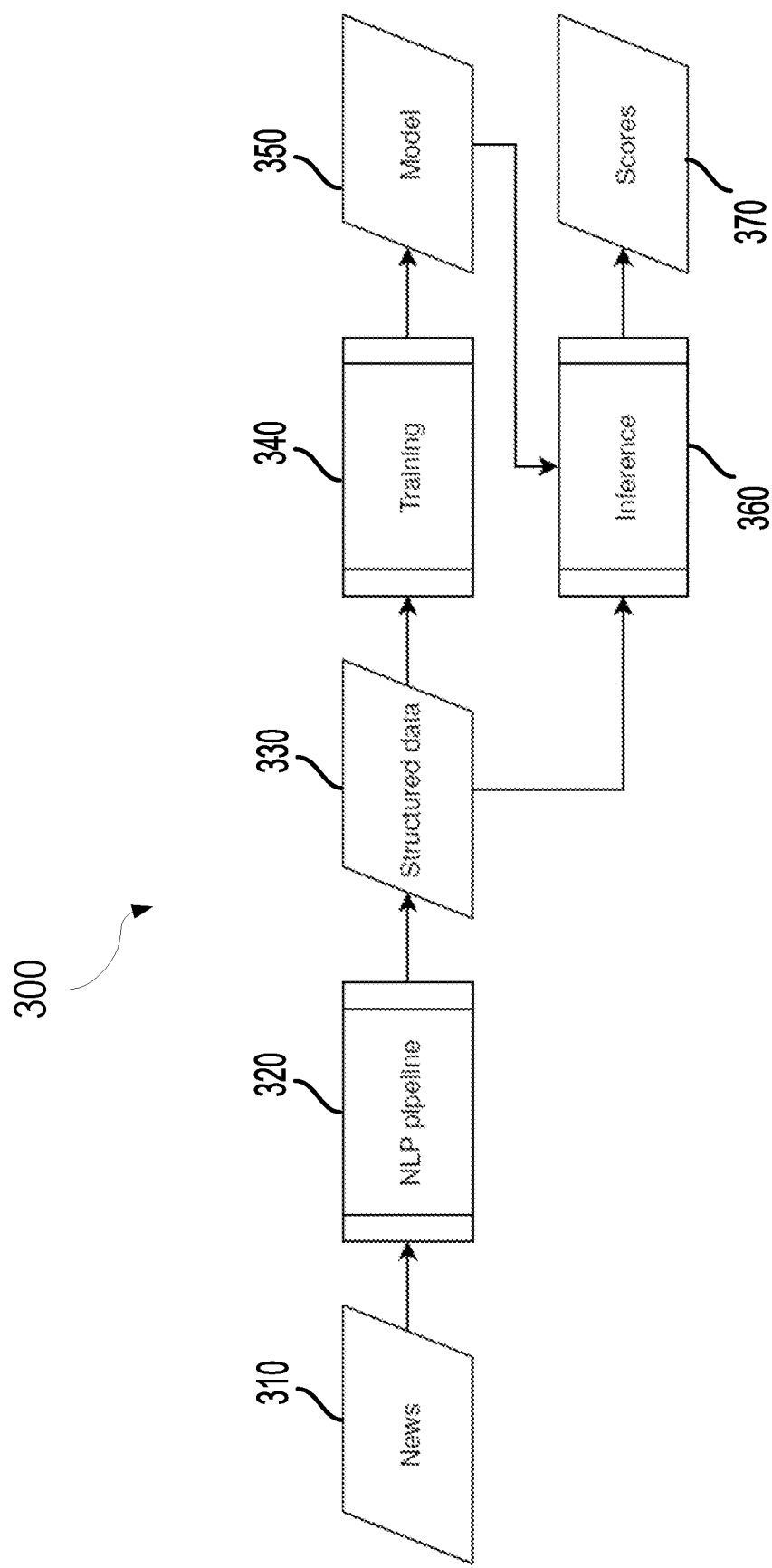
FIG. 3 illustrates a simplified block diagram illustrating operations for processing natural language statements, in accordance with an example of the present application.

Reference is made to FIG. 3, which illustrates a simplified block diagram 300 illustrating operations for processing natural language statements, in accordance with an example of the present application. The example operations may be performed by a processor 101 of the system 110 of FIG. 1, or a variation of such system. The example operations for processing natural language statements may include a machine learning model 119, such as an auto-encoder type model, or the like, that may be trained to predict or infer future data content associated with an entity. Entities may be organizations, companies, persons, or the like. The example operations may be configured to infer likely content of future news articles about a company, based on a history of news articles about the company.

Further, the example operations may include operations for assessing novelty of newly received or observed data content relative to previously published data content and for assessing how impactful the newly received or observed data content may be. For instance, operations may be conducted for generating a novelty score or an impact score. An impact score may provide a measure of how unexpected the newly observed data content may be or may provide a measure of how an entity associated with the impact score may change in response to the newly observed data content.

At operation 310, a processor may receive data content. The data content may include one or more articles (e.g., news articles, journal articles, etc.), documents, Internet webpages, or the like. The data content may be received from other computing devices or servers via the network 150 (FIG. 1).

In some examples, the received data content may be a collection of documents written in one or more languages, such as English or French. The received data content may be in natural language. That is, the data content may be provided without any regard to structured constraints on the form of the data content.

At operation 320, the processor may conduct processor readable instructions associated with the NLP unit 111 of FIG. 1. For example, the processor may conduct operations to chunk the data content into one or more statements (e.g., parse sentences, paragraphs, or entire articles into subdivisions), embed the statements using an embedding structure (e.g., flag content type, categories, topics, or the like, in the one or more statements), or identify one or more entities in the statements.

To illustrate, the processor may receive a news article and parse the news article into several sentences or paragraphs. The processor may map words or phrases to vectors of real numbers to represent the data content as structured data. The resulting structured data may be stored in a database structure of the data storage 108 and may be associated with an entity index value corresponding to one or more entities identified in the data content. The structured data may include one or more records, where each record may be an embedding of the respective statements and may include an associated entity index value to identify an entity to which the statement may apply.

In some examples, the processor may embed statements to indicate content, categories, or topics may be present in the statements. For instance, a vocabulary $V_T$ may represent a set of topics of a plurality of topics. The topics may include 10,000, 20,000, or any number of topics. A vocabulary in this context refers to a set of tokens, where a token index may denote a position within the vocabulary $V_T$. Examples of categories or topics may include current events, science and technology, business, politics, local news, arts and culture, sports, or the like.

In some examples, the processor may associate an entity index value to embedded statements. The entity index value may identify that a statement is associated with the organization, company, person, or the like. In some examples, the NLP unit 111 of the system 110 may associate an entity index value to a statement based on an entity index value vocabulary $V_E$ of approximately 30,000 companies or organizations that may be commonly cited or mentioned in news content.

In some examples, the processor may generate statements in an example format: $s=(t_1, t_2, \ldots t_T)$, where T is the size of a $V_T$. The processor may assign values to the statement such that $t_i$ may be assigned a value of 1 when a topic $t_i$ is observed or identified in the statement. The processor may assign a value of 0 when the a topic associated with $t_i$ is not observed or identified.

A record may be a combination of a statement identified by the processor and an entity index value associated with an entity of the entity index value vocabulary $V_E$. That is, a record may include an embedding of a statement and a unique identifier of an entity to which the statement is associated. Other data structures or statement formats for embedding statements to provide vectors of real-valued numbers may be contemplated.

At operation 330, the processor may store structured data based on the generated records. The structured data may be stored in a database structure including statements associated with one or more entities.

In some examples, the structured data may include one or more matrices representing entity embeddings. As an illustrative example, matrices representing entity embeddings may have a dimension $N_E \times D_E$, where each of $N_E$ entities may be embedded as a $D_E$ dimensional vector.

In some examples, the structured data may include matrices representing one or more statement histories. As an illustrative example, matrices representing statement histories may have a dimension $D_T \times N_H$, where each of $N_H$ statements may be represented by a vector of 1s and 0s indicating which of $D_T$ topics may be included in the respective statements. As will be described, in some examples, the statements of one or more matrices representing statement histories may be processed into hidden states of one or more recurrent neural networks (RNNs).

At operation 340, the processor may conduct processor readable instructions associated with the training unit 113 of FIG. 1. For example, the processor may conduct operations of a training process to learn parameters of a model 119 (FIG. 1) for computing the probability of observing data content associated with a particular entity, based on that particular entity being associated with previously observed data content. In some examples, operations of the training unit 113 may be based on a history of contiguous records respectively associated with one or more particular entity index values. Example data sets for operations of the training unit 113 may be created based on windowed rolling buffers accumulating history of records spanning a duration for respective entities $V_E$. In some examples, history and entity indices may be serialized in a custom binary format which may be de-serialized into memory 109 in a layout by the machine learning model 119 for training operations. Example operations of the training unit 113 will be described herein with reference to an example machine learning model 119.

Based on operations of the training unit 113 of FIG. 1, the processor, at operation 350, may generate a machine learning model 119 (FIG. 1). As will be described in examples herein, a machine learning model 119 may include parameter values associated with latent representations of entities, the context of those entities (e.g., what content, categories, or topics may be typically associated with entities), or spatial transformations of the latent representations of one or more entities.

At operation 360, the processor may conduct processor readable instructions associated with the inference unit 115 of FIG. 1. For example, the processor may conduct operations to predict future statements or data content associated with a particular entity. In some examples, the processor may conduct operations to compare a predicted future statement (e.g., next expected statement) and a newly observed statement and generate proposed changes to the machine learning model 119 based on the newly observed statement or data content. In some examples, the processor may conduct operations to predict future statements or data content based on structured data stored at operation 330 and based on the model generated at operation 350.

At operation 370, the processor may generate scores for providing additional information associated with newly observed data content (e.g., news articles, Internet webpage links, or the like). For example, the processor may generate a novelty score for indicating whether data content of a newly observed news article would be: (i) highly predictable; and/or (ii) whether the newly observed news article provides new information about an entity that may not yet be publicly known.

In some other examples, the processor may generate an impact score for describing whether the newly observed news article is expected to influence an outlook or perception of the entity associated with the newly observed news article. For instance, the impact score may provide an indication on whether the entity associated with the newly observed news article may cause the entity to be further followed or further written about in the media or on social media, or whether the newly observed news article may not have any impact on the extent of news coverage of the entity. Other types of scores for providing additional information associated with the newly observed data content may be contemplated.

Figure 4:
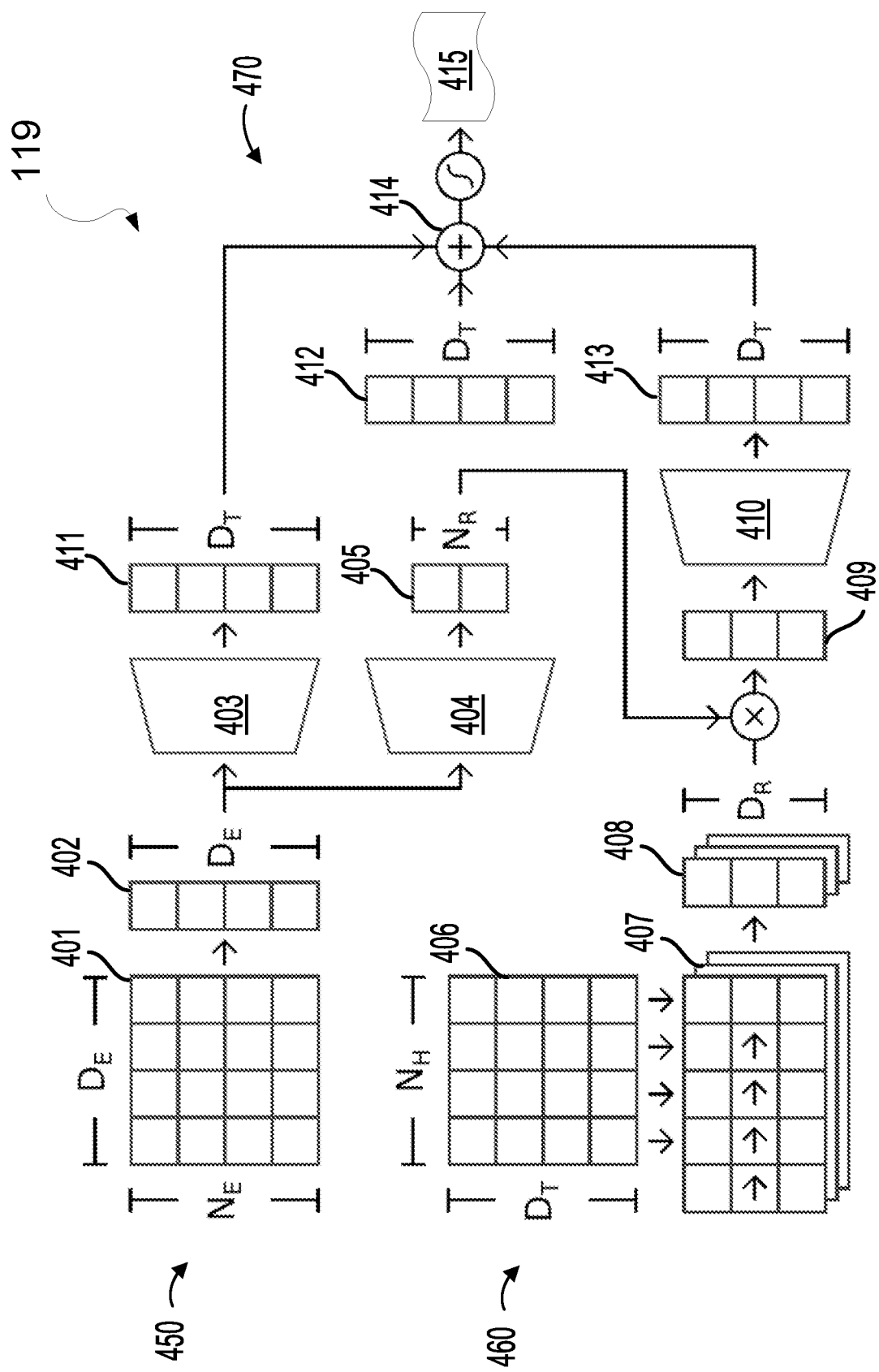
FIG. 4 illustrates a machine learning model, in accordance with another example of the present application.

Reference is made to FIG. 4, which illustrates a machine learning model 119, in accordance with an example of the present application.

As an illustrative example, when the processor conducts operations for training (e.g., operation 340 of FIG. 3), the machine learning model 119 may receive an entity index value e and a history of statements for the entity, H, associated with the entity index value e. The machine learning model 119 may predict future data content or statement. In some examples, loss may be calculated as a binary cross-entropy between an observed statement and the predicted data content or statement. In some examples, statements may be grouped using different time-scales, such that predicted data content or statements may be associated with a future time or period of time.

In the example machine learning model 119, model parameters may be updated to reduce loss. The processor may conduct training operations (e.g., operations associated with operation 340 of FIG. 3) such that calculated loss from a set of training data content is calculated to be a minimum threshold value. In some examples, the set of data content processed for training the machine learning model 119 may not be associated with parameter values for the various transforms or dimension vectors representing the latent representations.

In FIG. 4, the machine learning model 119 may include an embedding data flow 450, a history data flow 460, and a content prediction data flow 470.

In some examples, the embedding data flow 450 may include features such as an entity embeddings matrix 401, an extracted entity embedding vector 402, a first transform 403, a second transform 404, and a content weight vector 405.

The entity embeddings matrix 401 may have dimension $N_E \times D_E$ representing entity embeddings, where each of $N_E$ entities may be embedded as a $D_E$ dimensional vector. To illustrate, the entity embeddings matrix 401 may include embeddings that may be refined over iterations of training operations (e.g. operation 340 of FIG. 3) to identify what content, categories, topics, or the like may be typical of the respective $N_E$ entities.

In some examples, a processor of the system 110 may extract a row of the entity embeddings matrix 401 corresponding to an entity e to provide an entity embedding. Respective entity embeddings may be associated with an entity embeddings vector 402.

In some examples, the first transform 403 may be a transform, a decoder, or the like, for decoding the entity embeddings vector 402 into an embedded content dimension vector 411 associated with a latent representation of an associated entity e. In some examples, the first transform 403 may be associated with a lossy compression method. In some examples, the embedded content dimension vector 411 may be dynamically refined based on training operations described herein and may include float values from negative ∞ to positive ∞ corresponding to content, categories, or topics associated with each respective entity e. For example, the embedded content dimension vector 411 may be derived from an entity embeddings vector 402. In some examples, the embedded content dimension vector 411 may represent differences from average embeddings of a global set of data content. In some examples, an average dimension vector 412 may be associated with average embeddings of a global set of data content.

In some examples, the second transform 404 may be a transform, a decoder, or the like, for generating a content weight vector 405 based on the entity embeddings matrix 401. For instance, the processor may conduct operations of the second transform 404 for decoding the entity embeddings vector 402 into a content weight vector 405. The second transform 404 may identify content, categories, or topics from the entity embeddings matrix 401 for consolidation into a content weight vector 405 to provide an indication on what content may be interesting for an identified entity. In some examples, the content weight vector 405 may provide weight data to the set of RNNs 407. In some examples, the second transform 404 may be associated with a lossy compression method. The content weight vector 405 may be combined with historical statement data or provided to a recurrent neural network for combination with historical data statement data.

In some examples, the history data flow 460 may include features such as a statement history matrix 406, a set of recurrent neural networks (RNNs) 407, statement history vectors 408, an entity state 409, and a third transform 410.

The statement history matrix 406 may have dimension $D_T \times N_H$, where each of the number of articles in history $N_H$ may be represented by a content representation vector of 1s and 0s indicating which of $D_T$ topics (or content, categories, or the like) are associated with a statement of data content. In some examples, the statement history matrix 406 may be processed into one or more hidden states of the set of RNNs 407. In some examples, the at least one content representation vector may be provided by at least one recurrent neural network. In some examples, the set of RNNs 407 may be a gated recurrent unit or a set of gated recurrent units.

In some examples, the statement history vectors 408 may be associated with a content representation vector of 1s and 0s indicating which of $D_T$ topics may be associated with a statement. In some example operations, the processor may transform the statement history matrix 406 or the statement history vectors 408 with the generated content weight vector 405 to provide a history vector 409. Further, the processor may transform the history vector 409 with the third transform 410 to provide a historical content dimension vector 413. In some examples, the history vector 409 may be a summary representation of historical articles associated with the particular entity.

The above described statement history matrix 406 and statement history vectors 408 may be associated with 1s and 0s. In some other examples, the respective matrices or vectors may be arbitrary vectors of floats. For instance, such a vector including arbitrary floats may be transformed into a topic vector of 0s and 1s based on a dot product into a topic space and processing the resulting vector using a sigmoid function to retrieve values between 0 and 1. Such values between 0 and 1 may be rounded to values of 0 or 1. Accordingly, in some examples, the statement history matrix 406 or the statement history vectors 408 may include arbitrary float values.

The historical content dimension vector 413 may be associated with a latent representation for the state of an particular entity. In some instances, the historical content dimension vector 413 may be inferred through the operations of the machine learning model 119 described herein. For instance, the historical content dimension vector 413 may be based on a learned or refined third transform 410 and/or the second transform 404 providing the content weight vector 405.

The topic prediction data flow 470 may include an embedded content dimension vector 411 and a historical content dimension vector 413. In some other examples, the topic prediction data flow 470 may include an average dimension vector associated with a global statement set.

In some examples, the processor of the system 110 may generate a content prediction score 415 by generating a combination 414 of the embedded content dimension vector 411 and the historical content dimension vector 413 and transforming the combination with an activation function. In some examples, the combination 414 may include a summation of the embedded content dimension vector 411 and the historical content dimension vector 413.

In some other examples, the processor may generate a prediction score 415 by generating a combination 414 of the average dimension vector 412 with the embedded content dimension vector 411 and the historical content dimension vector 413. That is, average embeddings of a global set of data content may be included for generating a prediction score 415. The processor may additionally transform the combination with an activation function.

In some examples, the activation function may include a sigmoid function. The sigmoid function may transform the combination of dimension vectors (e.g., embedded content dimension vector 411, average dimension vector 412, and historical content dimension vector 413) from float values (e.g., negative ∞ to positive ∞) to values between −1 and 1 or values between 0 and 1. Other activation functions may be contemplated, such as Tan h, parametric relu, or other examples.

In some examples, the content prediction score 415 may be a content vector indicating a prediction of what a predicted statement embedding vector may be. To illustrate, upon taking into account the embedded content dimension vector 411, the average dimension vector 412, and the historical content dimension vector 413, if there is a 0.2 chance (e.g., a weighting, percentage, or the like) that the predicted statement may be associated with "science and technology" news, the content vector indicating that prediction may have a value of 0.2 for a vector element associated with "science and technology". Thus, the content prediction score 415 can be a vector indicating a prediction of what a predicted statement embedding vector may be.

Based on the examples herein, the machine learning model 119 may calculate P (s|e, H), which may be associated with a probability of a statement given an entity and a history. That is, the machine learning model 119 may receive an entity index value e for deriving a latent representation of the entity e (e.g., embedded content dimension vector 411). The machine learning model 119 may receive a history of $N_H$ previous statements $H=(s_1, s_2, \ldots, s N_H)$ from which the machine learning model 119 derives a latent representation of the state of the entity (e.g. statement history vectors 408). The latent representation of the state of the entity may be transformed with information derived from the entity embeddings (e.g., content weight vector 405) to provide a history vector 409 and/or a historical content dimension vector 413. The processor may calculate a probability of new or further data statement or content by combining generated latent representations (e.g., embedded content dimension vector 411 and historical content dimension vector 413) and transforming the combinations to provide predicted content data. It can be appreciated that the embedding matrices and/or transform functions may be iteratively refined for minimizing training loss. The processor conducting operations of the training unit 113 may suspend once training loss is minimized.

In some examples, the processor may conduct operations for iteratively training the machine learning model 119 in conjunction with model freezing. For example, parameters (e.g., prior probability of a statement, given no prior information about an entity) for generating a probability of a statement for a particular entity (e.g. P(s)) may be trained and fixed. Parameters involved in computing P(s|e) may be trained and fixed. Further, parameters computing P(s|e,H) may trained and fixed.

Based on the example operations for iteratively training the machine learning model 119 in conjunction with model freezing, the processor may conduct operations such that respective latent representations of the machine learning model 119 are associated with particular information. For instance, the latent representation of the state of the entity may be expected to vary when a new statement is observed indicating a variation from prior information associated for that entity. Accordingly, the processor may conduct operations for generating a latent representation of a particular entity associated with that particular entity and, subsequently or independently, generate parameters to represent a state associated with how an observed statement may modify the prior description of the particular entity.

Figure 5:
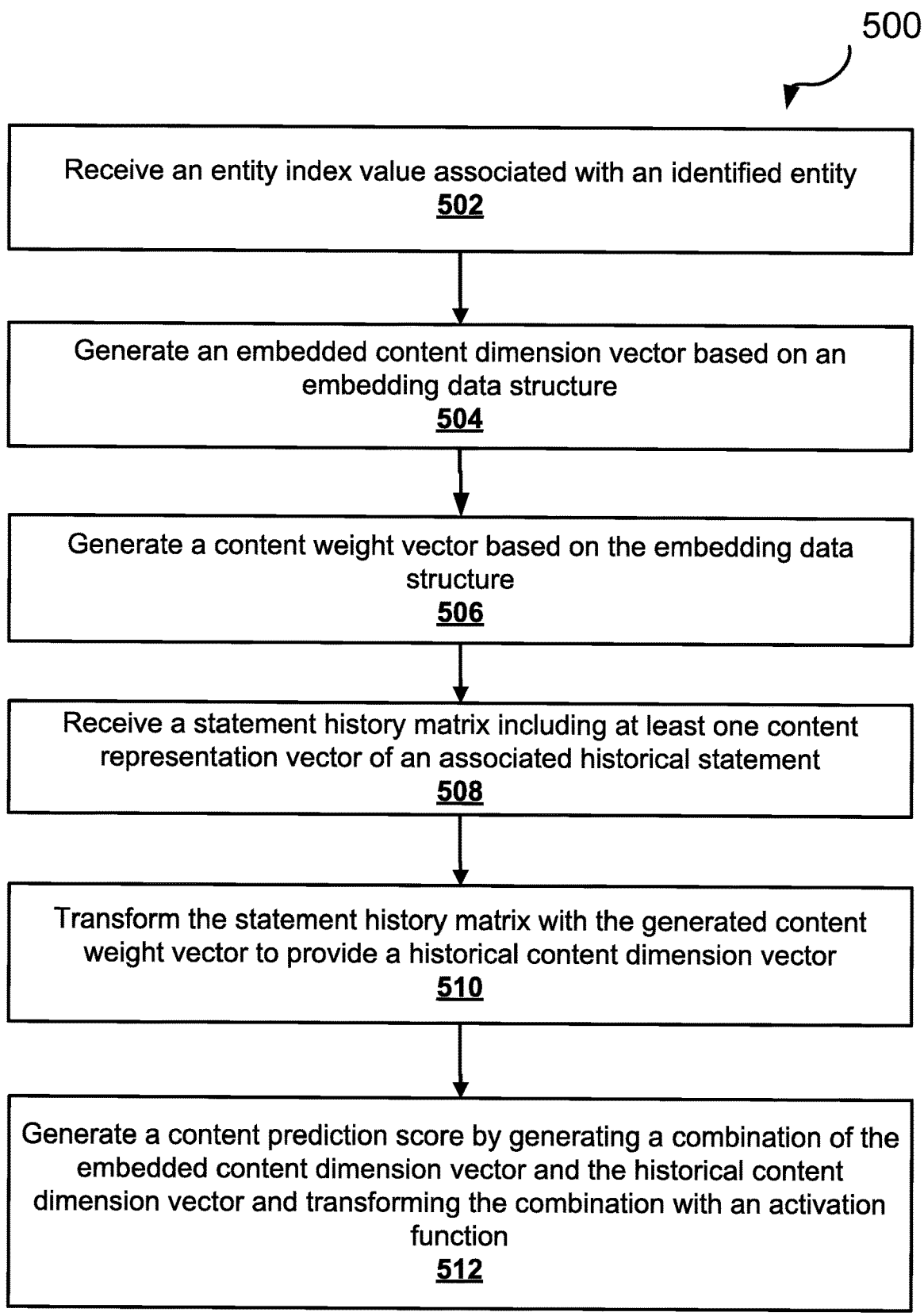
FIG. 5 illustrates a flowchart of a method of processing natural language statements, in accordance with an example of the present application.

Reference is made to FIG. 5, which illustrates a flowchart of a method 500 of processing natural language statements, in accordance with an example of the present application. The method 500 may be conducted by a processor 101 of the system 110. Processor readable instructions may be stored in memory 109 and may be associated with one or more of the NLP unit 111, the training unit 113, the inference unit 115, or the scoring unit 117 of FIG. 1, or other processor readable instruction units not illustrated in FIG. 1. The method 500 may be associated with the operations described with reference to the machine learning model 119 illustrated in FIG. 4.

At operation 502, the processor may receive an entity index value associated with an identified entity. The identified entity may be an organization, a company, a person, or the like. In some examples, the entity index value may be associated to the identified entity mentioned or referenced within data content, paragraphs, statements, or the like. The entity index value may be associated with a vocabulary $V_E$ of a set of companies or organizations that may be commonly cited or mentioned in news content.

At operation 504, the processor may generate an embedded content dimension vector based on an embedding data structure associated with statements made about the identified entity.

Referring again to FIG. 4, the embedded content dimension vector 411 may be derived from an entity embeddings vector 402. Respective entity embeddings vector 402 may be extracted from a data subset of the entity embeddings matrix 401, which corresponds to an entity to provide entity embeddings. In some examples, the data subset may be a row of the entity embeddings matrix 401. In some examples, the entity embeddings matrix 401 may be associated with an n-dimensional space (e.g., 512 dimensions) and may be a weight matrix associated with characteristics of an entity. That is, the entity embeddings matrix 401 may be a learned or dynamic representation of one or more entities. The entity embeddings matrix 401 may be associated with characteristics of numerous entities of the vocabulary $V_E$, such as the set of companies or organizations that may be commonly cited or mentioned in news content.

In some examples, generating the embedded content dimension vector includes applying a first transform 403 (FIG. 4) to an entity embeddings vector 402 derived from a row of the entity embeddings matrix 401. In some examples, the transform 403 may transform the entity embeddings matrix 401 having 512 dimensions to the embedded content dimension vector 411 having a fewer number of dimensions. It may be appreciated that the transform 403 may include a lossy compression method and may include operations to generate the embedded content dimension vector 411 representing a weighted representation of topic values associated with a particular entity. Accordingly, when generating the embedded content dimension vector 411, the processor may identify a row of the entity embeddings matrix 401 associated with the entity index value to identify an entity embeddings vector 402 and transform the entity embeddings vector 402 into the embedded content dimension vector 411. The embedded content dimension vector 411 may represent a weighted representation of content values. It may be appreciated that the above example applies a transform; however, it may be contemplated that other operations for decoding the entity embeddings vector 402 into a vector of topic values may be contemplated.

In some examples, the first transform 403 may combine topics to identify prototypical topics that tend to be commonly identified together for particular entities. It may be appreciated that the term topics may be understood to be groupings or identification of data that may have one or more common elements.

To illustrate the first transform 403, the system 110 may be observing 1,000 topics in a news feed. The system 110 may be configured with 100 values for representing the 1,000 topics. Accordingly, the first transform 403 may be configured to associate 100 prototypical topics to the 1,000 topics that may be observed in a news feed. In an example, the first transform 403 may include 1,000 rows, where each row may include 100 elements. The $i^{th}$ row may be associated with weights to indicate combining the 100 elements of an entity to determine the extent that topic i may be typical for that entity. The topic i may be one of the 1,000 topics. Further, the columns j of the transform 403 may indicate which of the 1,000 topics may be typical for an entity, where the entity may include a large value in the embedding element j (e.g., where j is one of 100 values learned for each entity).

In an example, a topic i=1 may correspond to a topic of "technology news" and a topic i=5 may correspond to a topic of "product release". Technology companies may typically be associated with news involving both "technology news" and "product release". Accordingly, the first transform 403 representation may be devised to combine "technology news" and "product release" as a prototypical topic (e.g., a value in the 100 values for representing 1,000 topics).

In a scenario where an entity embedding vector having a j=0 element corresponds to a prototypical topic combining "technology news" and "product release", the first transform 403 may be a matrix with row i=1 having values (1, 0, 0, . . . ) and row i=5 having values (1,0,0 . . . ). In the present example, when an entity is associated with an entity embedding with a large value at column j=0, then the prototypical topic associated with "technology news"/"product release" may be likely. Accordingly, in some examples, the first transform 403 may combine topics for associating with prototypical topics that may commonly appear together for entities.

At operation 506, the processor generates a content weight vector 405 based on the embedding data structure. The embedding data structure may be the entity embeddings matrix 401. In some examples, generating the content weight vector 405 includes applying a second transform 404 (FIG. 4) to an entity embeddings vector 402. The second transform 404 may include operations for condensing the entity embeddings vector 402, where the content weight vector 405 may be associated with content, categories, or topics that may be strongly representative or descriptive of the particular entity. Referring again to the machine learning model 119 of FIG. 4, the content weight vector 405 may be combined with outputs or operations of one or more of the set of RNNs 407.

In some examples, generating the content weight vector 405 includes applying a second transform 404 (FIG. 4) to an entity embeddings vector 402 derived from a row of the entity embeddings matrix 401. In some examples, the second transform 404 may transform the entity embeddings vector 402 from numerous dimensions to a fewer number of dimensions to identify content, categories, or topics that may be representative or descriptive of the particular entity.

In some examples, the second transform 404 may combine prototypical topics into a small vector of prototypical entities. Accordingly, the second transform 404 may be associated with a transformation to a smaller dimension space. An entity with an embeddings vector (1, 0, 0 . . . ) (e.g., representing a technology company) may be found to be highly related to an entity with an embeddings vector (0, 1, 0, 0 . . . ) (e.g., representing a hardware manufacturing company). In the present example, the second transform 404 representation may be devised to combine a first column and a second column into one prototypical entity. That is, the second transform 404 may be akin to the first transform 403, but different in that the second transform 404 combines prototypical topics into a vector of prototypical entities (e.g., instead of an input learning prototypes of an output [first transform 403], the output learns prototypes of the input [second transform 404]).

At operation 508, the processor may receive a statement history matrix 406 including at least one content representation vector associated with a historical statement. The machine learning model 119 may generate a probability of a statement based on an entity index value and history associated with statement history matrix 406.

At operation 510, the processor may transform the statement history matrix 406 with the generated content weight vector to provide a historical content dimension vector 413. The historical content dimension vector 413 may be a latent representation of a state of a particular entity having an entity index value e.

In some examples, the statement history matrix 406 including at least one content representation vector of an associated historical statement may be provided by at least one of the set of RNNs (407). The processor may transform the statement history matrix 406 with the content weight vector 405 to provide a history vector 409. In some scenarios, the processor may conduct operations of a third transform 410 to the history vector 409 to provide the historical content dimension vector 413.

In some examples, operations of the third transform 410 may be similar to operations of the first transform 403. For instance, the third transform 410 may combine topics that may commonly occur together in a news article (e.g., set of data content), whereas the first transform 402 may combine topics that may commonly occur together for a given entity. Operations of the third transform 410 may provide a latent representation for the state of a particular entity that may be a summarization of a history of articles. That is, the third transform 410 may be associated with operations for combining elements summarizing a history of articles.

In some examples, the historical content dimension vector 413 may be associated with a weighted representation of topic values associated with numerous prior statements associated with a particular entity corresponding to the entity index value. In some examples, the historical content dimension vector 413 may be a weighted representation of topic values associated with approximately 100 historical statements or data content articles. In some scenarios, the selected number of historical data content articles associated with the statement history matrix 406 may be empirically determined. The historical content dimension vector 413 may be associated with content, categories, topics, or the like that may be identified as a latent representation of the historical (e.g., based on past statements) state of the particular entity. In some examples, the weighted representation of topic values may be associated with the immediately prior or last historical statement observed in data content (e.g., the historical content dimension vector 413 may be based on one previous statement or article associated with a particular entity).

At operation 512, the processor may generate a content prediction score by generating a combination of the embedded content dimension vector 411 and the historical content dimension vector 413. As described, the embedded content dimension vector 411 may be associated with a weighted representation of typical topic values for a particular entity based on the embedding data structure (e.g., entity embeddings matrix 401 capturing characteristics of an entity). Further, the historical content dimension vector 413 may be associated with weighted representation of content, categories, topics, or the like that may be identified as a state for the particular entity based on historical statements. The respective dimension vectors may include float values between negative infinity and positive infinity. At operation 512, the processor may sum the embedded content dimension vector 411 and the historical content dimension vector 413 and transform the summation with a sigmoid function to include values between negative 1 and positive 1 or between 0 and 1.

In some examples, at operation 512, the processor may receive an average dimension vector 412 associated with a global statement set. The average dimension vector 412 may be associated with average embeddings of a global set of data content. That is, the global set of data content may include data of entities included in an entity vocabulary $V_E$ of the system 110. The average embeddings may be based on back propagation operations, for instance, to identify that the global set of data content may include 30% of content being associated with science and technology, etc. Further, the processor may combine the average dimension vector 412 with the embedded content dimension vector 411 and the historical content dimension vector 413 for generating the content prediction score.

Based on some examples described herein, the processor, at operation 512, may generate the content prediction score based on at least one of: (i) weight distributions that may be characteristic or typical of a particular entity (e.g., based on the embedded content distribution vector 411); (ii) weight distributions that may be identified as a state of the particular entity based on historical statements (e.g., based on the historical content dimension vector 413; or (iii) weight distributions associated with data content or statements of a global data content set (e.g., based on the average dimension vector 412).

Figure 6:
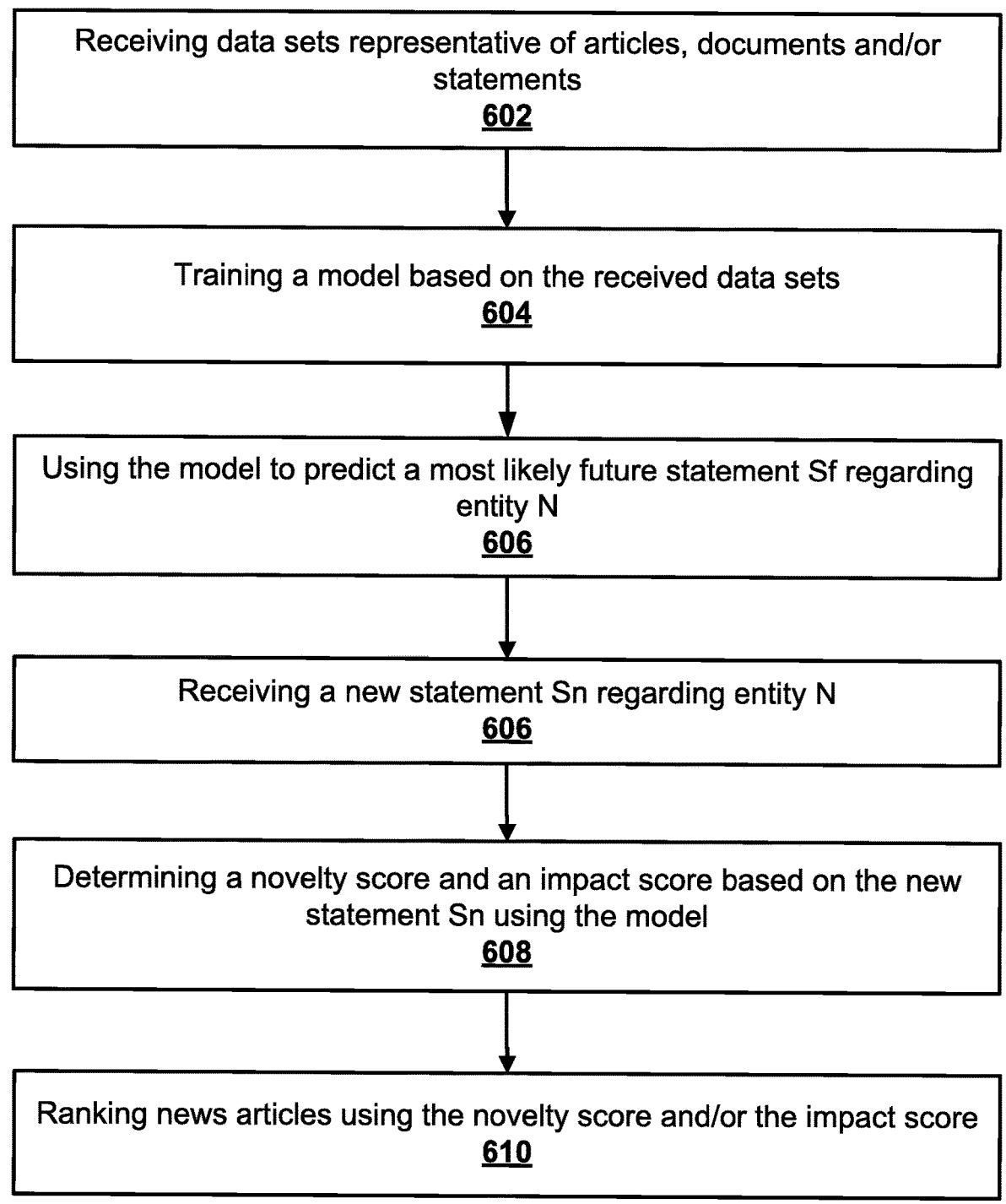
FIG. 6 illustrates a flowchart of a method of processing natural language statements, in accordance with another example of the present application.

Reference is made to FIG. 6, which illustrates a flowchart of a method 600 of processing natural language statements, in accordance with another example of the present application. The method 600 may be conducted by a processor 101 of the system 110 (FIG. 1). Processor readable instructions may be stored in memory 109 and may be associated with one or more of the NLP unit 111, the training unit 113, the inference unit 115, or the scoring unit 117 of FIG. 1. In some examples, some operations of the method 600 may be associated with operations described with reference to the machine learning model 119 illustrated in FIG. 4.

At operation 602, the processor 101 may receive one or more data sets associated with data content. Data content may be provided in formats such as Internet webpages, journals, articles, forums, or the like. The data content may be provided using natural language. In some examples, natural language may be provided without use of any particular form or data structure.

The processor 101 may chunk the data sets associated with data content into statements and may associate the one or more statements with one or more entities. The respective entities may be associated with an entity index value.

At operation 604, the processor 101 may conduct operations of the training unit 113 (FIG. 1) based on the one or more received data sets to generate a machine learning model 119 (FIG. 1). Referring again to FIG. 4, the processor 101 may conduct operations for generating respective transforms, such as the first transform 403, the second transform 404, or the third transform 410. The respective transforms may be learned transform operations for generating content dimension vectors associated with latent representations associated a particular entity or associated with a state of a particular entity. In some examples, one or more of the first transform 403, the second transform 404, or the third transform 410 may configure the embedded content dimension vector 411, the content weight vector 405, and/or the historical content dimension vector 413 to represent the same number of dimensions.

In some examples, the processor 101 may conduct operations for updating the entity embeddings matrix 401, which may include embeddings associated with respective entities refined over iterations of training operations. As described, the entity embeddings matrix 401 may identify what content, categories, topics, or the like may be typical of the respective entities. In some examples, the processor 101 may conduct operations for updating the statement history matrix 406. The processor 101 may update the statement history matrix 406 to include newly observed data content associated with a particular entity. In some other examples, the processor 101 may conduct operations for updating the average dimension vector associated with average embeddings of a global set of data content. In some other examples, the processor 101 may conduct other operations to update other features of the machine learning model 119, such as updating the set of RNNs 407, which in some examples may provide the at least one statement history vectors 408.

At operation 606, the processor may conduct operations based on the machine learning model 119 to predict a likely future statement $S_f$ associated with a particular entity identified with an entity index value. That is, the processor may generate a predicted statement based on a generated content prediction score (see e.g., operation 512 of FIG. 5). In some examples, the content prediction score 415 (FIG. 4) may be a vector indicating a prediction of what a predicted statement embedding vector may be.

In some examples, the predicted statement may be based on content trends over a duration of time that have been identified within the set of historical statements associated with the statement history matrix 406. The predicted statements may be based on what topics associated with the particular entity have been typical (e.g., identified at least in part by the content weight vector 405) over a past duration of time. The predicted statements may be based on characteristics of the particular entity over a past duration of time (e.g., identified at least in part by the embedded content dimension vector 411).

In some examples, the processor, at operation 608, may determine a novelty score: (i) based on a newly observed or identified statement $S_n$ received at the system 110; and (ii) based on the predicted statement. To illustrate, the system 110 may receive a newly observed statement referencing Company X (e.g., identified entity). The processor may conduct operations to identify whether the data content (e.g., one or more statements) may be predictable based on the machine learning model 119 and an entity index value for Company X and/or whether the data content represents new information that may not have been publicized at a previous point in time. The novelty score may be derived from a function: $\Delta_n(s, \hat{s})$.

In some examples, the novelty score may be calculated based on a Kullback-Leibler (KL) Divergence between an observed statement embedding vector and the predicted statement embedding vector. In some examples herein, the predicted statement embedding vector may be the output indicated as the content prediction score 415 of FIG. 4. In the scenario that the KL Divergence calculation indicates that the observed statement embedding is different than the predicted statement embedding, the system 110 may indicate that the observed statement is novel.

In some examples, the processor may combine a data representation of the identified statement s with a set of historic statements (e.g., $N_H$ statements) associated with the statement history matrix 406 to provide an updated statement history matrix (e.g., $H=(s_1, s_2, \ldots, s\, N_H, s)$. The processor may generate an updated content prediction score and a subsequent predicted statement (e.g., ŝ') based on the updated statement history matrix.

Further, the processor, at operation 608 may determine an impact score derived from $\Delta_i(\hat{s}, \hat{s}')$. That is, the processor may determine an impact score based on the predicted statement and the subsequent predicted statement. A generated impact score may describe the estimated influence of the identified statement received at the system 110 on the state of the particular entity. For instance, the impact score may provide an indication on whether the associated entity may be further written about (e.g., further generated statements) or how much the particular entity is expected to change given the information in the article.

In some examples, calculating the impact score may include computing the sum of the square of differences between generated statement vectors associated with: (i) the predicted statement; and (ii) the subsequent predicted statement.

To illustrate, $\Delta n$ and $\Delta i$ are the novelty and impact difference functions, which compute some scalar value which tends to zero as their parameters or arguments become more similar. A statement or group of statements that are associated with a small $\Delta n$ value may be predicted relatively easily and may be associated with a low novelty score. A statement or group of observed statements that are associated with a large $\Delta i$ may impart a different or large effect on the state of the entity h (e.g., latent representation of a state of a particular entity associated with a historical content dimension vector 413 (FIG. 4)), and thus may be associated with a relatively large impact score.

The systems and methods described herein may provide machine learning models for inferring publication of data content associated with a particular entity and may compare newly observed data content to predict content associated with an entity for evaluating novelty or impact of the newly observed data content. Accordingly, in some examples, the processor may generate a signal for generating a communication based on the determined impact score associated with the identified statement. For example, the communication may include a message highlighting the identified statement $S_n$ received at the system. Example messages may include electronic mail (e-mail) messages, banner notifications within an operating system environment of a computing device, or other types of message for providing an indication to the content consumer. That is, the content consumer may desire to be alerted once newly observed data content (e.g., statements) may be associated with a novelty score or may be associated with an impact score greater than a threshold value.

In some other examples, the communication may include a message that excludes the identified statement received at the system 110. For instance, the content consumer may configure the system 110 to exclude identified statements received at the system 110 that do not meet a threshold impact score or a threshold novelty score. Newly observed or identified statements not associated with a novelty and/or impact score that meets a threshold score may not be interesting to the content consumer.

In some other examples, the communication may include a communication including a message associated with ranking the identified statement $S_n$ received at the system 110 among a list of ranked statements. For instance, the system 110 may be used to rank news articles published about a particular company, or a set of companies, in order to reveal which articles may be more relevant to understanding new information about the companies and/or changes to the companies.

An example of a content consumer employing features of the system 110 and methods described herein may be a research analyst writing opinion memos and research memos regarding companies listed on publically traded securities exchanges. The research analyst may setup the system 110 for identifying outlier data content material that may be associated with novelty scores and/or impact scores meeting respective threshold values. Accordingly, in some scenarios, the system 110 may be configured to generate communication for transmission to the research analyst (e.g., via email notification, short message service notification, or the like). In another example, the system 110 may be configured to trigger an action in response to identifying data content material (e.g., one or more statements) that may be associated with novelty scores and/or impact scores meeting respective threshold values.

Figure 7:
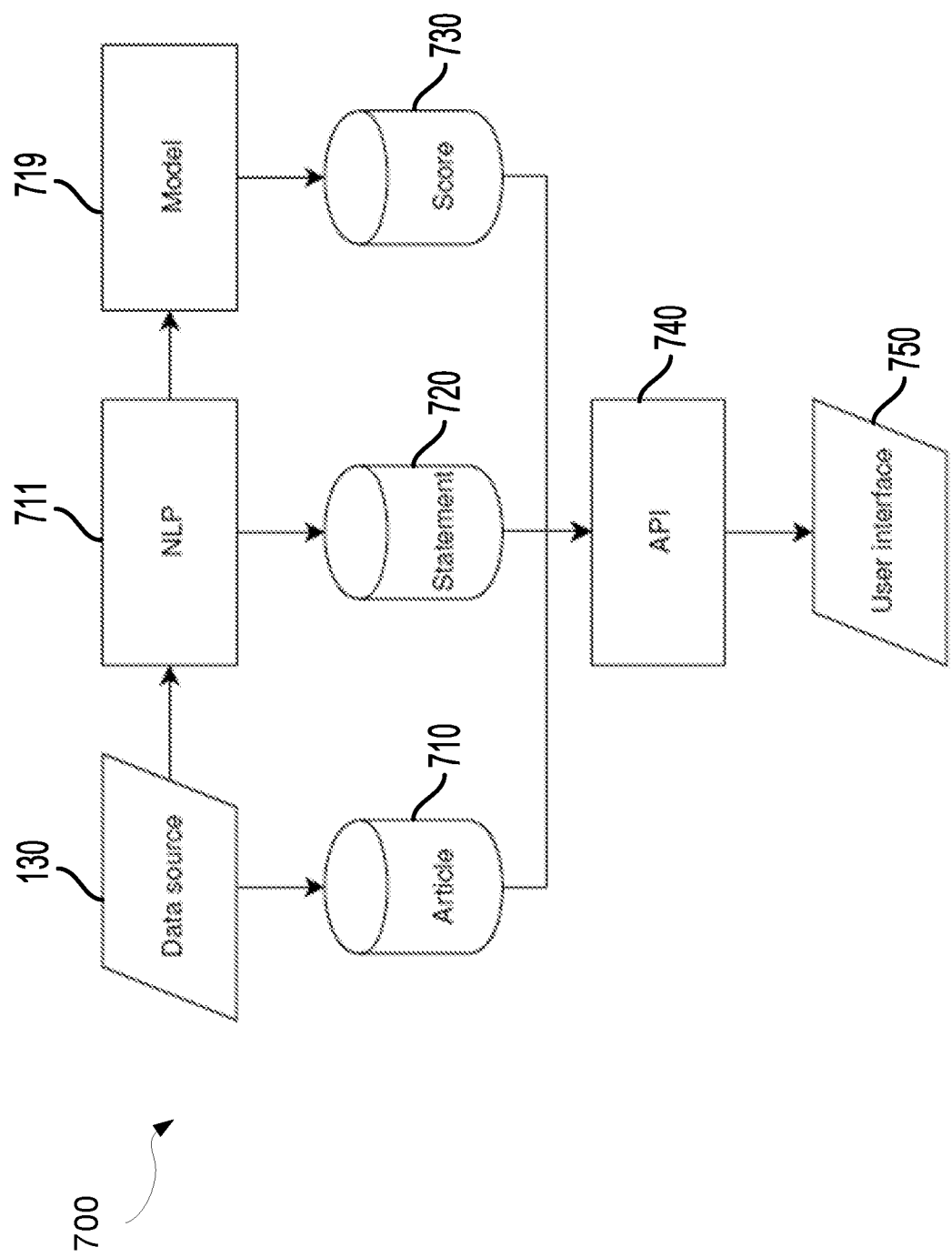
FIG. 7 illustrates a simplified block diagram of the system of FIG. 1.

Reference is made to FIG. 7, which illustrates a simplified block diagram 700 of the system 110 of FIG. 1. The system 110 may be configured to generate scores (e.g., content prediction scores, novelty scores, impact scores, or the like) and store data content (e.g., articles, copies of Internet webpages, or the like) that may be published by a data publishing source. The system 110 may be configured to retrieve the stored data content for a data consumer user who may desire to identify relevance of the data content to a particular entity (e.g., a particular company).

As illustrated in FIG. 7, the system 110 may store data content received from a data source 130 via a network 150 (FIG. 1) as articles 710. The processor may conduct operations of the NLP unit 111 with the received data content and may generate statements 720 based on the data content (e.g., articles 710). As described, in some examples, the processor may generate statements 720 in a format such as: $s=(t_1, t_2, \ldots, t_T)$, where T is the size of a $V_T$. The processor may assign values to the statement such that $t_i$ may be assigned a value of 1 when a topic $t_i$ is observed or identified in the statement. The processor may assign a value of 0 when the a topic associated with $t_i$ is not observed or identified.

The processor may conduct operations associated with the training unit 113 (FIG. 1) for training the model 719. The machine learning model 119 of FIG. 4 may be an example of the model 719 illustrated in FIG. 7. The processor may conduct operations associated with the model 719 to generate scores 730 associated with one or more newly observed data content or statements and store the scores at the system 110. In some examples, the processor may retrieve articles 710, statements 520, and/or scores 730 and may be transmitted, via an application programming interface (API) 740 for presentation to a content consumer on a user interface 750. The user interface 750 may be provided by a display interface or display hardware of a computing device.

Figure 8:
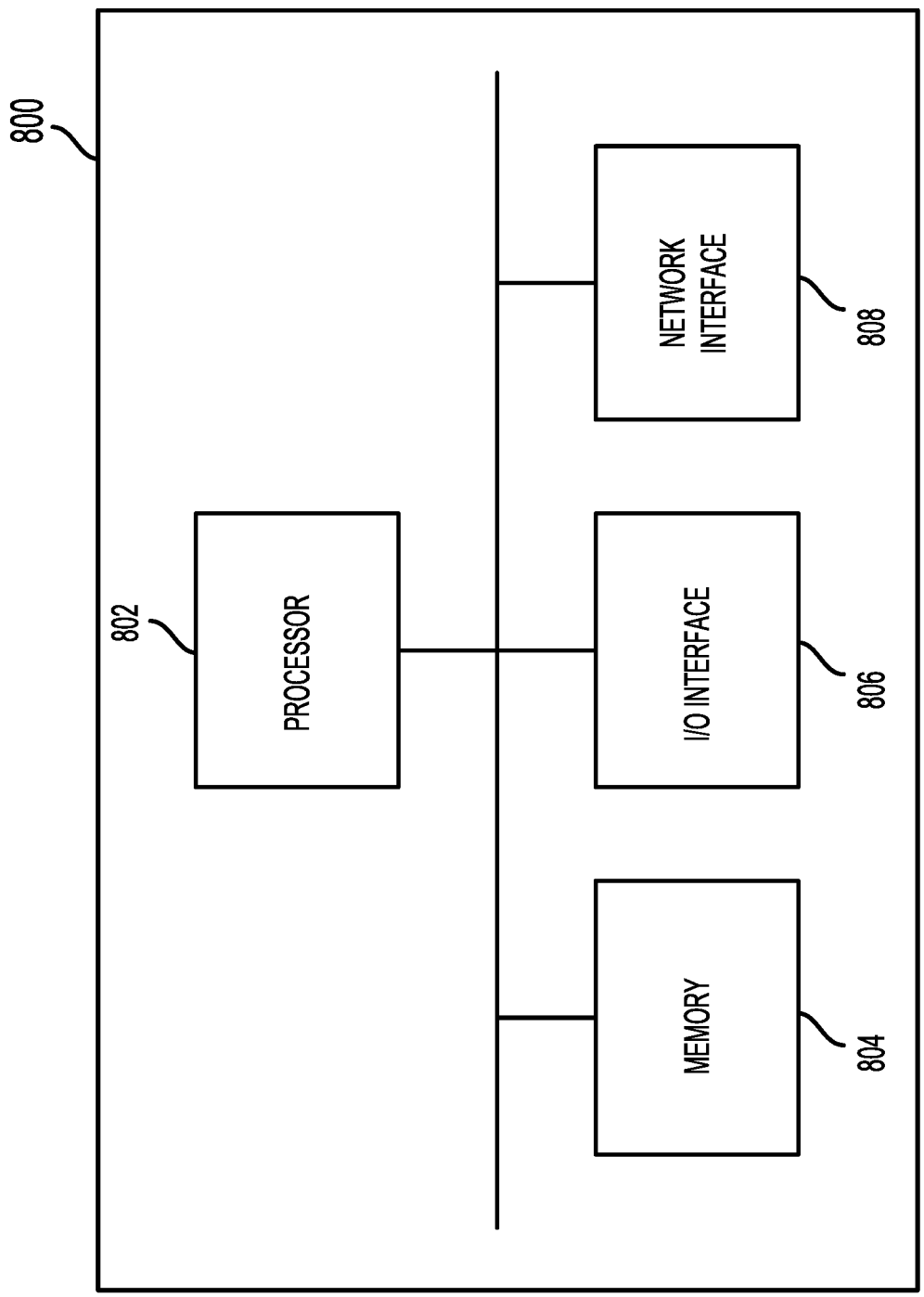
FIG. 8 illustrates a simplified block diagram of a computing device, in accordance with an example of the present application.

Reference is made to FIG. 8, which illustrates a simplified block diagram of a computing device 800, in accordance with an example of the present application. As an example, the system 110 of FIG. 1 may be implemented using the example computing device 800 of FIG. 8. In other examples, the computing device 800 may be a computing device operating as a data content source and communicating with the system 110 (FIG. 1) via the network 150. In some other examples, the computing device 800 may be associated with a content consumer.

The computing device 800 includes at least one processor 802, memory 804, at least one I/O interface 806, and at least one network communication interface 808. The computing device 800 may be configured as a machine learning server adapted to dynamically maintain one or more neural networks.

The processor 802 may be a microprocessor or microcontroller, a digital signal processing (DSP) processor, an integrated circuit, a field programmable gate array (FPGA), a reconfigurable processor, a programmable read-only memory (PROM), or combinations thereof.

The memory 804 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

The I/O interface 806 may enables computing device 800 to interconnect with one or more input devices, such as a keyboard, mouse, camera, touch screen and a microphone, or with one or more output devices such as a display screen and a speaker.

The networking interface 808 may be configured to receive and transmit data sets representative of the machine learning models, for example, to a target data storage or data structures. The target data storage or data structure may, in some embodiments, reside on a computing device or system such as a mobile device.

Some examples described herein may include a system for processing and assessing the importance of natural language statements as they pertain to a set of entities. The system may be based on an auto-encoder type model which may be trained to predict future data content, such as news articles, about a given entity, such as a company associated with an entity index code. The model may be used to infer the most likely contents of future articles to be published about a company, given a history of articles about that company. That prediction can be compared to newly observed articles to derive information about the importance of those article. In some examples, a novelty score and impact score can be calculated for an article, indicating how unexpected the article may be or how much the company in question is expected to change given the information in the article.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

As can be understood, the examples described above and illustrated are intended to be exemplary only.

What is claimed is:

1. A computer implemented system for processing natural language statements, the system comprising:
    a processor; and
    a memory coupled to the processor storing processor readable instructions that, when executed, cause the processor to:
        receive an entity index value associated with an identified entity and a time-scale associated with the entity index value;
        provision a content prediction model defined by refined model parameters associated with the time-scale associated with the entity index value, wherein provisioning the content prediction model includes refining a prototypical topic transform and refining a prototypical entity transform based on the time-scale associated with the entity index value;
        generate, based on the prototypical topic transform, an embedded content dimension vector based on an embedding data structure associated with statements made about the identified entity for biasing prototypical topics refined for the identified entity over the time-scale;
        generate a content weight vector based on the embedding data structure and the prototypical entity transform for combining prototypical topics associated with one or more prototypical entities;
        receive a statement history matrix including at least one content representation vector of an associated historical statement;
        transform the statement history matrix with the generated content weight vector to provide a historical content dimension vector;
        generate a content prediction score by generating a combination of the embedded content dimension vector and the historical content dimension vector and transforming the combination with an activation function; and
        transmit a signal for communicating the content prediction score to update a machine learning model or identify novelty or impact of an identified statement received at the system.

2. The system of claim 1, wherein the processor readable instructions, when executed, cause the processor to:
    generate a predicted statement based on the content prediction score; and
    determine a novelty score based on the identified statement received at the system and the predicted statement.

3. The system of claim 2, wherein the processor readable instructions, when executed, cause the processor to:
    combine a data representation of the identified statement with a set of historic statements associated with the statement history matrix to provide an updated statement history matrix;
    generate an updated content prediction score and a subsequent predicted statement based on the updated statement history matrix; and
    determine an impact score based on the predicted statement and the subsequent predicted statement.

4. The system of claim 3, wherein the processor readable instructions, when executed, cause the processor to:
    generate a signal for generating a communication based on the impact score.

5. The system of claim 4, wherein the communication comprises at least one of a message highlighting the identified statement received at the system, a message excluding the identified statement received at the system, or a message associated with ranking the identified statement received at the system among a list of ranked statements.

6. The system of claim 1, wherein generating the content prediction score includes:
    receiving an average dimension vector associated with a global statement set; and
    combining the average dimension vector with the embedded content dimension vector and the historical content dimension vector.

7. The system of claim 1, wherein the at least one content representation vector is provided by at least one recurrent neural network.

8. The system of claim 7, wherein the recurrent neural network is a gated recurrent unit.

9. The system of claim 1, wherein the activation function includes a sigmoid function.

10. The system of claim 1, wherein generating the embedded content dimension vector includes:
    identifying a data subset of the embedding data structure associated with the entity index value to identify an entity embeddings vector; and
    transforming the entity embeddings vector to the embedded content dimension vector associated with a weighted representation of content values.

11. The system of claim 1, wherein generating the content weight vector based on the embedding data structure includes:
   identifying a data subset of the embedding data structure associated with the entity index value to identify an entity embeddings vector; and
   transforming the entity embeddings vector to the content weight vector to provide a condensed representation of the entity associated with the entity index value.

12. A computer implemented method for processing natural language statements, the method comprising:
   receiving an entity index value associated with an identified entity and a time-scale associated with the entity index value;
   provisioning a content prediction model defined by refined model parameters associated with the time-scale associated with the entity index value, wherein provisioning the content prediction model includes refining a prototypical topic transform and refining a prototypical entity transform based on the time-scale associated with the entity index value;
   generating, based on the prototypical topic transform, an embedded content dimension vector based on an embedding data structure associated with statements made about the identified entity for biasing prototypical topics refined for the identified entity over the time-scale;
   generating a content weight vector based on the embedding data structure and the prototypical entity transform for combining prototypical topics associated with one or more prototypical entities;
   receiving a statement history matrix including at least one content representation vector of an associated historical statement;
   transforming the statement history matrix with the generated content weight vector to provide a historical content dimension vector;
   generating a content prediction score by generating a combination of the embedded content dimension vector and the historical content dimension vector and transforming the combination with an activation function; and
   transmitting a signal for communicating the content prediction score to update a machine learning model or identify novelty or impact of an identified statement received at the system.

13. The computer implemented method of claim 12, comprising:
   generating a predicted statement based on the content prediction score; and
   determining a novelty score based on the identified statement received at the system and the predicted statement.

14. The computer implemented method of claim 13, comprising:
   combining a data representation of the identified statement with a set of historic statements associated with the statement history matrix to provide an updated statement history matrix;
   generating an updated content prediction score and a subsequent predicted statement based on the updated statement history matrix; and
   determining an impact score based on the predicted statement and the subsequent predicted statement.

15. The computer implemented method of claim 14, comprising:
   generating a signal for generating a communication based on the impact score, wherein the communication comprises at least one of a message highlighting the identified statement received at the system, a message excluding the identified statement received at the system, or a message associated with ranking the identified statement received at the system among a list of ranked statements.

16. The computer implemented method of claim 12, wherein generating the content prediction score includes:
   receiving an average dimension vector associated with a global statement set; and
   combining the average dimension vector with the embedded content dimension vector and the historical content dimension vector.

17. The computer implemented method of claim 12, wherein the at least one content representation vector is provided by at least one recurrent neural network.

18. The computer implemented method of claim 17, wherein the recurrent neural network is a gated recurrent network.

19. The computer implemented method of claim 12, wherein the activation function includes a sigmoid function.

20. A non-transitory computer-readable medium or media having stored thereon machine interpretable instructions which, when executed by a processor, cause the processor to perform a computer implemented method for processing natural language statements, the method comprising:
   receiving an entity index value associated with an identified entity and a time-scale associated with the entity index value;
   provisioning a content prediction model defined by refined model parameters associated with the time-scale associated with the entity index value, wherein provisioning the content prediction model includes refining a prototypical topic transform and refining a prototypical entity transform based on the time-scale associated with the entity index value;
   generating, based on the prototypical topic transform, an embedded content dimension vector based on an embedding data structure associated with statements made about the identified entity for biasing prototypical topics refined for the identified entity over the time-scale;
   generating a content weight vector based on the embedding data structure and the prototypical entity transform for combining prototypical topics associated with one or more prototypical entities;
   receiving a statement history matrix including at least one content representation vector of an associated historical statement;
   transforming the statement history matrix with the generated content weight vector to provide a historical content dimension vector;
   generating a content prediction score by generating a combination of the embedded content dimension vector and the historical content dimension vector and transforming the combination with an activation function; and
   transmitting a signal for communicating the content prediction score to update a machine learning model or identify novelty or impact of an identified statement received at the system.

* * * * *